US012109171B2

(12) United States Patent
Laugros et al.

(10) Patent No.: US 12,109,171 B2
(45) Date of Patent: Oct. 8, 2024

(54) BLISTER PACKAGE FOR AT LEAST ONE PHARMACEUTICAL OR FOOD SUPPLEMENT PRODUCT OF THE GUM TYPE

(71) Applicant: Opella Heathcare Group SAS, Gentilly (FR)

(72) Inventors: Nicolas Laugros, Paris (FR); Franck Superbi, Paris (FR)

(73) Assignee: Opella Healthcare Group SAS, Neuilly sur Seine (FR)

( * ) Notice: Subject to any disclaimer, the term of this patent is extended or adjusted under 35 U.S.C. 154(b) by 0 days.

(21) Appl. No.: 17/768,096

(22) PCT Filed: Oct. 8, 2020

(86) PCT No.: PCT/EP2020/078270
§ 371 (c)(1),
(2) Date: Apr. 11, 2022

(87) PCT Pub. No.: WO2021/069581
PCT Pub. Date: Apr. 15, 2021

(65) Prior Publication Data

US 2024/0082107 A1 Mar. 14, 2024

(30) Foreign Application Priority Data

Oct. 9, 2019 (EP) .................................... 19306320

(51) Int. Cl.
*A61J 1/03* (2023.01)
*B65D 75/58* (2006.01)

(52) U.S. Cl.
CPC .......... *A61J 1/035* (2013.01); *B65D 75/5827* (2013.01); *B65D 2575/367* (2013.01)

(58) Field of Classification Search
CPC .......... B65D 75/5827; B65D 2575/367; B65D 2575/366; B65D 2575/3227; B65D 75/327; A61J 1/035
(Continued)

(56) References Cited

U.S. PATENT DOCUMENTS 3,456,784 A 7/1969 Sirago
4,694,960 A 9/1987 Phipps et al.
(Continued)

FOREIGN PATENT DOCUMENTS

EP 0679587 A1 11/1995
EP 1867580 A1 12/2007
(Continued)

OTHER PUBLICATIONS

International Search Report & Written Opinion for PCT/EP2020/078270, mailed Feb. 26, 2021.
(Continued)

*Primary Examiner* — Steven A. Reynolds
(74) *Attorney, Agent, or Firm* — IceMiller LLP

(57) ABSTRACT

The invention provides a blister package for at least one pharmaceutical or food supplement product of the gum type, comprising a support shell having a flat portion and at least one cavity formed on said flat portion, said at least one cavity being defined by a lateral wall extending from said flat portion and a bottom wall linked to said lateral wall, at least one gum comprising at least one gelling agent and being molded into said at least one cavity, a cover film fixed on said flat portion and closing said at least one cavity, at least one tearing notch formed both on said support shell and cover film, and at least one tearing channel formed at least on said lateral wall and facing said at least one tearing notch, said at least one tearing channel defining a complementary channel shape formed on said molded gum.

17 Claims, 10 Drawing Sheets

(58) Field of Classification Search
USPC .................................. 206/531, 528, 538, 223
See application file for complete search history.

(56) References Cited

U.S. PATENT DOCUMENTS

| | | | | |
|---|---|---|---|---|
| 5,088,603 | A * | 2/1992 | Kirkpatrick | B65D 75/58 206/532 |
| 5,551,567 | A | 9/1996 | Malone et al. | |
| 5,881,869 | A | 3/1999 | Hudson | |
| 6,036,016 | A | 3/2000 | Arnold | |
| 6,129,936 | A | 10/2000 | Gustafsson | |
| 9,469,454 | B2 * | 10/2016 | Morel | B65D 75/22 |
| 10,589,914 | B2 * | 3/2020 | Maruyama | B65B 9/04 |
| 2005/0100566 | A1 * | 5/2005 | Morikane | A61Q 1/04 424/448 |
| 2005/0150904 | A1 | 7/2005 | Suchan et al. | |
| 2006/0138016 | A1 * | 6/2006 | Harper | A61J 1/035 206/532 |
| 2007/0284279 | A1 | 12/2007 | Doskoczynski et al. | |
| 2013/0081968 | A1 * | 4/2013 | Kurtze | B65D 75/327 206/461 |
| 2013/0160408 | A1 * | 6/2013 | Neff | B65D 75/323 206/532 |
| 2015/0114857 | A1 | 4/2015 | Thery et al. | |
| 2017/0196214 | A1 | 7/2017 | Lubic | |

FOREIGN PATENT DOCUMENTS

| | | | |
|---|---|---|---|
| JP | 2000152752 | A | 6/2000 |
| JP | 2009544540 | A | 12/2009 |
| JP | 2013514949 | A | 5/2013 |
| WO | 2005/087614 | A1 | 9/2005 |
| WO | 2016/085907 | A1 | 6/2016 |

OTHER PUBLICATIONS

Office Action issued in Colombian Patent Application No. NC2002/0005900, dated Feb. 15, 2024 [10 pages].

* cited by examiner

BLISTER PACKAGE FOR AT LEAST ONE PHARMACEUTICAL OR FOOD SUPPLEMENT PRODUCT OF THE GUM TYPE

CROSS-REFERENCE TO RELATED APPLICATIONS

This application is a National Stage of International Patent Application No. PCT/EP2020/078270, filed on Oct. 8, 2020, which claims priority to European Patent Application No. 19306320.3, filed on Oct. 9, 2019, the disclosures of which are incorporated by reference in their entireties.

FIELD OF THE INVENTION

The invention relates to a blister package for at least one pharmaceutical or food supplement product of the gum type.

The invention further relates to a method for manufacturing a blister package for such a pharmaceutical or food supplement product of the gum type.

BACKGROUND ART

Blister packages are known from EP 0 679 587, EP 1 867 580, U.S. Pat. Nos. 3,456,784, 5,088,603, 6,036,016. They comprise notches formed on a blister receptacle for opening this receptacle by tearing. The notches can be made to render the blister packages child-resistant.

It is already known a blister package which comprise notches and channels formed on a blister receptacle for opening the receptacle by tearing. Notches facilitate the start of the tear, while channels guide the tear. Such a blister package is described for instance in U.S. Pat. No. 4,694,960.

All the above blister packages are used for classical pharmaceutical or food supplement products such as pills or tablets, which are hard and not deformable.

Other pharmaceutical or food supplement products such as gums exist. Gums comprises at least one gelling agent and are deformable. The blister packages already known are not convenient to receive such gums because when the blister receptacle is open by pushing, there is a risk to deform, crush and thus damage the gum.

SUMMARY OF THE INVENTION

The invention is directed to a blister package for a pharmaceutical or food supplement product of the gum type, which is particularly convenient not to damage the gum when the blister package is open and the gum extracted from the blister package.

The invention accordingly provides a blister package for a pharmaceutical or food supplement product of the gum type, comprising a support shell having a flat portion and at least one cavity formed on said flat portion, said at least one cavity being defined by a lateral wall extending from said flat portion and a bottom wall linked to said lateral wall, at least one gum comprising at least one gelling agent and being molded into said at least one cavity, a cover film fixed on said flat portion and closing said at least one cavity, at least one tearing notch formed both on said support shell and cover film, and at least one tearing channel formed at least on said lateral wall and/or on said bottom wall and facing said at least one tearing notch, said at least one tearing channel defining a complementary channel shape formed on said molded gum.

In the blister package according to the invention, the notch is formed on both shell and cover film, so that both shell and cover film are torn when the blister package is open.

Furthermore, the tearing channel is formed on the shell and faces the tearing notch, so that the tear goes from the tearing notch to the tearing channel very easily.

Besides, there is a synergistic effect between the tearing notch and the tearing channel formed on the shell and the gum molded in the shell, because the tearing channel drives the tear and allows to extract, by unsticking if any, the gum from the shell thanks to the complementary channel shape formed on this gum.

Thanks to the blister package according to the invention, the gum is not damaged when the blister package is open and the gum extracted from the blister package.

Features which are preferred as being very simple, convenient and economical for embodying the blister package according to the invention are described below.

Said at least one tearing notch can be made on a peripheral outline of said blister package.

Said at least one tearing notch can be made on an internal edge of said blister package.

Said at least one tearing notch may have a V-shape, a tip of the V being directed towards said at least one tearing channel.

The blister package may comprise at least one pre-tearing channel formed on said flat portion and located between said at least one tearing notch and said at least one tearing channel.

Said at least one pre-tearing channel can meets said at least one tearing channel.

Said at least one tearing channel may extend from a first side of said cavity on said lateral wall to said bottom wall.

Said at least one tearing channel may further extend from said bottom wall to a second side on said lateral wall, said second side being opposite to said first side.

Said at least one tearing channel may extend along a straight line on said cavity.

Said at least one tearing channel may extend along a straight line and next along a curved line on said cavity.

Said at least one tearing channel may extend continuously.

Said at least one tearing channel may be formed positively on said cavity, so that said gum has a complementary channel shape which protrudes like a rib.

Said at least one tearing channel may be formed negatively on said cavity, so that said gum has a complementary channel shape which entails like a recess.

Said blister package may comprise a plurality of blister units detachably from each other, each blister unit comprising a gum molded into one said cavity and being configured to extract said gum by tearing said blister unit thanks to one said tearing notch and one said tearing channel.

The invention is also directed to a conditioning unit comprising one or a plurality of blister packages for at least one pharmaceutical or food supplement product of the gum type as described above.

The invention also provides a blister package for a pharmaceutical or food supplement product of the gum type, comprising a support shell having a flat portion and at least one cavity formed on said flat portion, said at least one cavity being defined by a lateral wall extending from said flat portion and having at least a corner portion, and a bottom wall linked to said lateral wall, at least one gum comprising at least one gelling agent and being molded into said at least one cavity, the at least one gum having a predetermined shape comprising at least one lateral corner, a cover film fixed on said flat portion and closing said at least one cavity, at least one tearing notch formed both on said support shell and cover film, and at least one tearing channel formed at least on said lateral wall and facing said at least one tearing notch, said at least one tearing channel being located at the corner portion of the lateral wall and defining a complementary channel shape formed on said molded gum at least at the location of the at least one lateral corner of the gum.

In the blister package according to the invention, the notch is formed on both shell and cover film, so that both shell and cover film are torn when the blister package is open. Furthermore, the tearing channel is formed on the shell and faces the tearing notch, so that the tear goes from the tearing notch to the tearing channel very easily. Besides, there is a synergistic effect between the tearing notch and the tearing channel formed on the shell and the gum molded in the shell, because the tearing channel drives the tear at the location of the corner portion and allows to extract, by unsticking if any, the gum from the shell thanks to the complementary channel shape formed on this gum at the location of the lateral corner.

The tearing channel is made commonly with the corner portion of the lateral wall and the complementary channel shape is thus made commonly on the gum with its lateral corner. Said otherwise, the shape of the gum and thus the shape of the cavity are used for at least partially masking respectively the complementary channel and the tearing channel.

Thanks to the blister package according to the invention, the gum is not damaged when the blister package is open and the gum extracted from the blister package.

The invention is also directed to a method for manufacturing a blister package for at least one pharmaceutical or food supplement product of the gum type as described above, wherein it comprises the following steps:

- providing a support shell having a flat portion and at least one cavity formed on said flat portion, said at least one cavity being defined by a lateral wall extending from said flat portion and a bottom wall linked to said lateral wall, said support shell further having at least one tearing channel formed at least on said lateral wall;
- molding at least one gum comprising at least one gelling agent into said at least one cavity so that said molded gum has a complementary channel shape formed by said at least one tearing channel;
- fixing a cover film on said flat portion and closing said at least one cavity;
- forming at least one tearing notch both on said support shell and cover film and facing said at least one tearing channel.

BRIEF DESCRIPTION OF THE DRAWINGS

The description of the invention now continues with a detailed description of a preferred embodiment given hereinafter by way of non-limiting example and with reference to the appended drawings.

DETAILED DESCRIPTION OF PREFERRED EMBODIMENTS

Figure 1:
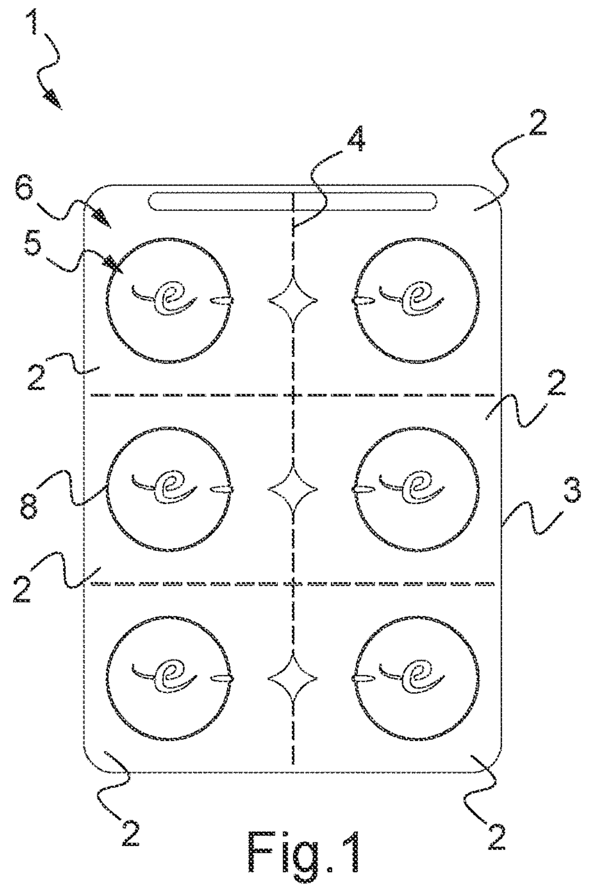
FIG. 1 is a top view of a blister package having a plurality of blister units, each of which comprising a pharmaceutical or food supplement product of the gum type.
Figure 2:
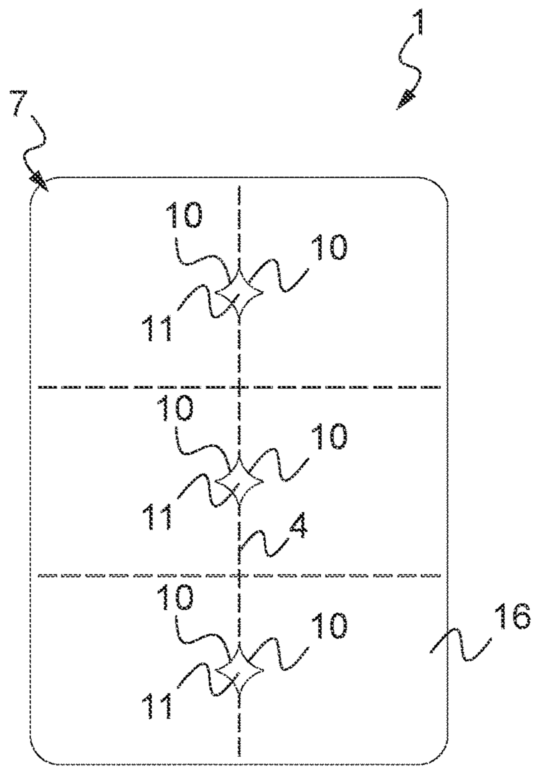
FIG. 2 is a bottom view of the blister package of FIG. 1.
Figure 3:
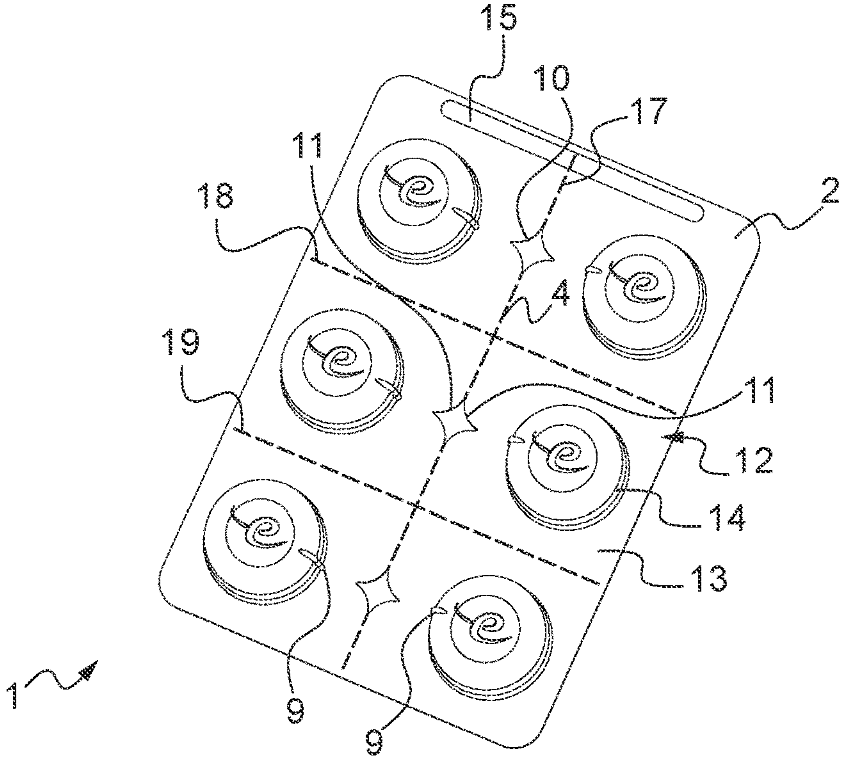
FIG. 3 is a perspective view of the blister package of FIGS. 1 and 2.

FIGS. 1 to 3 show a blister package 1 which comprises a plurality of blister units 2 detachably from each other.

The blister package 1 here has six blister units 2 each comprising a pharmaceutical or food supplement product of the gum type 5.

In variant, the blister package may comprise more or less than six blister units.

The blister package 1 has a peripheral outline 3, which is here for instance of a substantially rectangular shape.

The blister package 1 has an internal edge 4 which is here for instance a straight line located in the middle of the blister package 1 and which divides the blister package 1 into two parts of three blister units 2.

The blister package 1 has also an upper surface 6 from which protrudes a plurality of housings 8, each of which containing a gum 5, and a lower surface 7 which is opposite to the upper surface 6.

The number of housings 8 is here equal to the number of blister units 2. In variant, a blister unit may comprise more than one gum and thus more than one housing.

The blister package 1 comprises a support shell 12 having a flat portion 13 and a plurality of cavities 14 formed on the flat portion 13. Each cavity 14 forms a housing 8 containing a gum 5.

Each gum 5 comprises at least one gelling agent, or gellant agent, and is molded into a respective cavity 14.

The blister package 1 further comprises a cover film 16 fixed on the flat portion 13 and closing all the cavities 14.

The support shell 12 is located on the upper surface 6 of the blister package 1, while the cover film 16 is located on the lower surface 7 of the blister package 1.

The blister package 1 may comprise a rib 15 formed in the support shell 12, on the upper surface 6 of the blister package 1.

The rib 15 here extends transversally and is located on two blister units 2.

The blister package 1 may also comprise pre-cut lines 17, 18 and 19, also called dotted lines, which are configured to facilitate detachment of each blister unit 2.

The pre-cut line 17 is here confused with the internal edge 4 and extends longitudinally, while the pre-cut lines 18 and 19 extend transversally and are configured to divide the blister package 1 into three parts, each including two blister units 2.

The blister package 1 comprises a plurality of recesses 11 located along the internal edge 4 and pre-cut line 17, each of these recesses 11 being formed by two tearing notches 10 facing one to each other.

The blister package 1 here comprises three recesses 11 formed by a total of six tearing notches 10.

Each tearing notch 10 is formed both on the support shell 12 and on the cover film 16, so that each recess 11 emerges both on upper and lower surfaces 6 and 7 of the blister package 1.

The blister package 1 further comprises a plurality of tearing channels 9, each formed in a respective cavity 14 and facing a tearing notch.

As further explained below, each tearing channel 9 defines a complementary channel shape formed on the gum 5 molded in the respective cavity 14.

Each blister unit 2 is formed by a portion of the support shell 12, by a portion of the cover film 16, by a housing 8 and cavity 14 receiving a gum 5, by a tearing notch 10 and by a tearing channel 9.

Furthermore, each blister unit 2 is delimited by a portion of the pre-cut line 17 and by a portion of at least one of the pre-cut lines 18 and 19.

Figure 4:
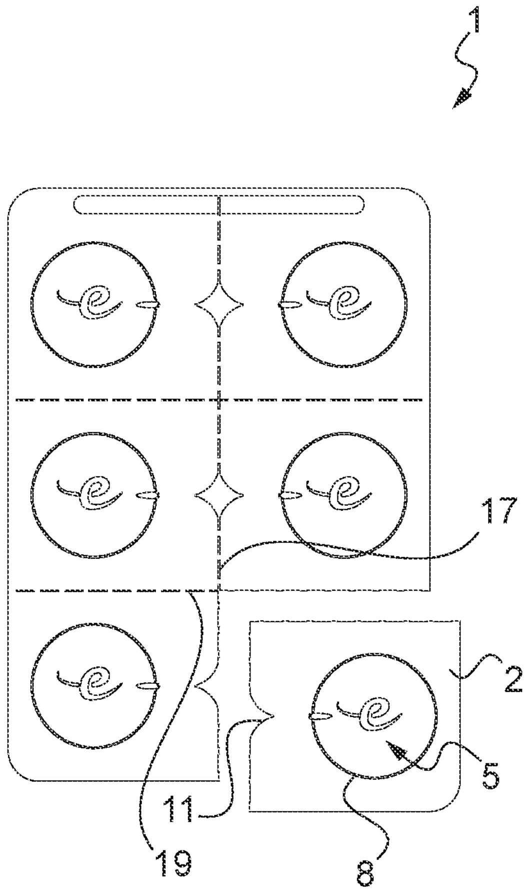
FIG. 4 is a similar view as FIG. 1, one of the blister unit being detached from the blister package.
Figure 5:
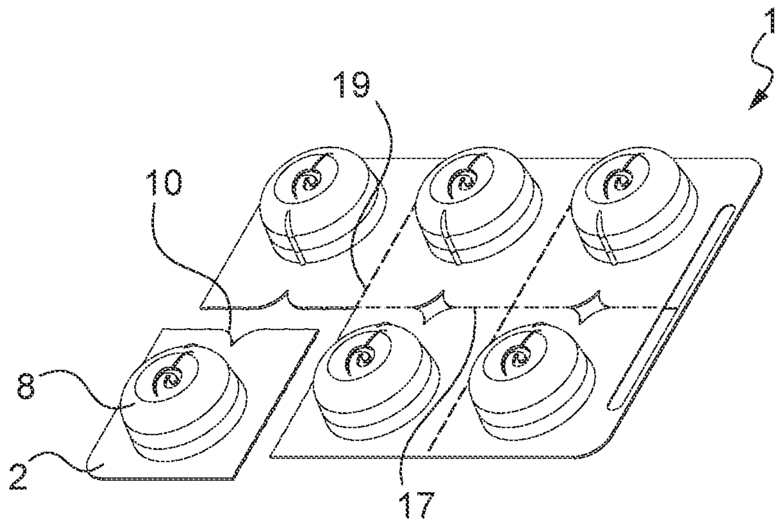
FIG. 5 is a perspective view of the blister package of FIG. 4.

FIGS. 4 and 5 show the blister package 1 of FIGS. 1 to 3, one of the blister units 2 being detached from the blister package 1.

The blister unit 2 has been detached thanks to the pre-cut line 17 and the pre-cut line 19.

The detachment of the blister unit 2 renders the tearing notch 10 free of access. In contrast, before detachment of the blister unit, the respective tearing notch is not free of access.

Figure 6:
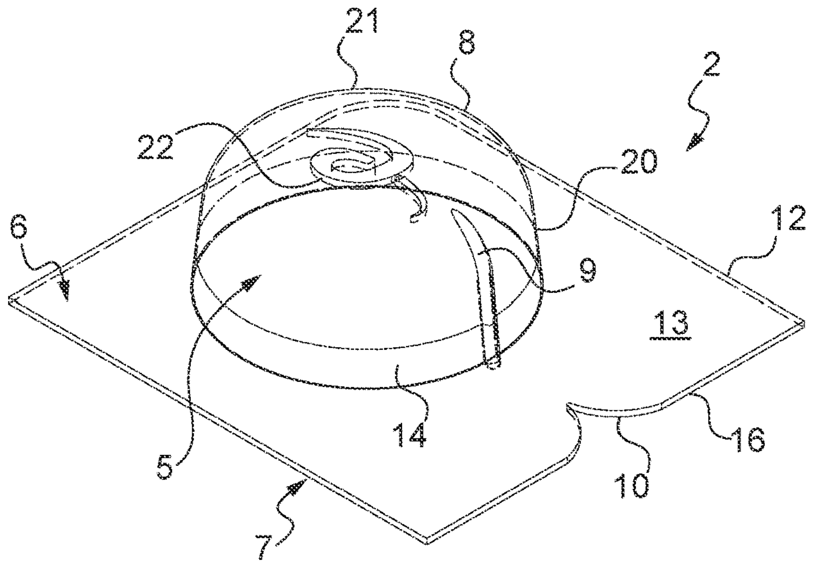
FIGS. 6 to 10 show the blister unit of FIGS. 4 and 5, taking alone and according to different and successive steps for extracting the gum by tearing the blister unit.

FIG. 6 shows the blister unit 2 detached from the blister package 1.

As explained above, the blister unit 2 is thus formed by a portion of the support shell 12, by a portion of the cover film 16, by a housing 8 protruding from the upper surface 6 and by a cavity 14 receiving the gum 5, by a tearing notch 10 and by a tearing channel 9.

The cavity 14 is defined by a lateral wall 20 extending from the flat portion 13 and by a bottom wall 21 linked to the lateral wall 20.

The lateral wall 20 is here conical while the bottom wall 21 is spherical.

The tearing channel 9 is here formed vertically on the lateral wall 20 and extends a little bit on the bottom wall 21.

In particular, the tearing channel 9 extends from a first side of the cavity 14, on the lateral wall 20 and at a junction with the flat portion 13, to the bottom wall 21.

The tearing channel extends along a straight line and continuously on the cavity 14.

The tearing channel 9 is here made positively on the cavity 14.

The tearing channel 9 and the tearing notch 10 are arranged so that they face one to each other.

The tearing notch 10 has a V-shape, a tip of the V being directed towards the tearing channel 9.

The tearing notch and the tearing channel are here remote to each other in order to keep a free space there between. Such a free space can be convenient for a user to grasp easily this part of the blister unit in order to tear it.

A marking member 22 is also formed on the cavity 14 and in particular in the bottom wall 21 thereof.

To be noted that each cavity 14 of the blister package 1 illustrated in FIGS. 1 to 5 are here similar.

FIGS. 7 to 10 show different and successive steps for extracting the gum 5 by tearing the blister unit 2.

Figure 7:
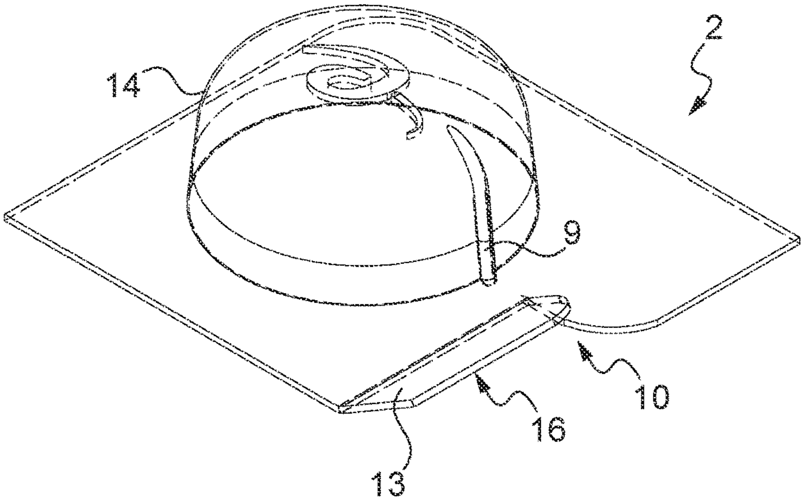

In FIG. 7, the blister unit 2 is pulled at the location of the tearing notch 10 and in direction of the cavity 14 and in particular of the tearing channel 9.

Both the flat portion 13 of the support shell 12 and the cover film 16 are torn.

Figure 8:
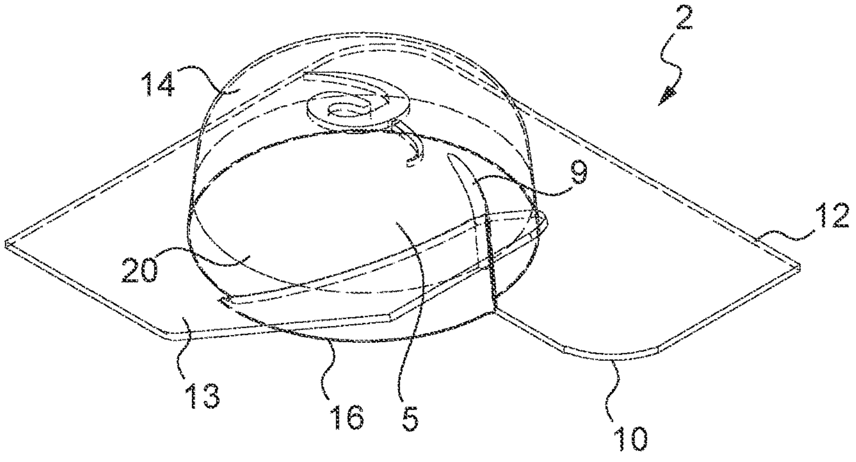

In FIG. 8, the blister unit 2 is pulled in the direction from the tearing notch 10 to the tearing channel 9.

The tearing channel 9 drives the tear of the lateral wall 20 of the cavity 14 of the support shell 12, on the first side of the cavity 14.

Figure 9:
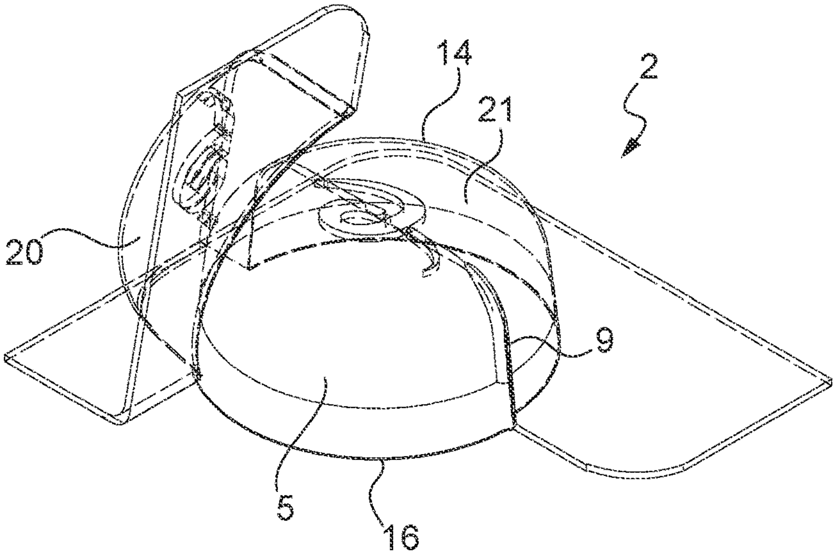
Figure 9:
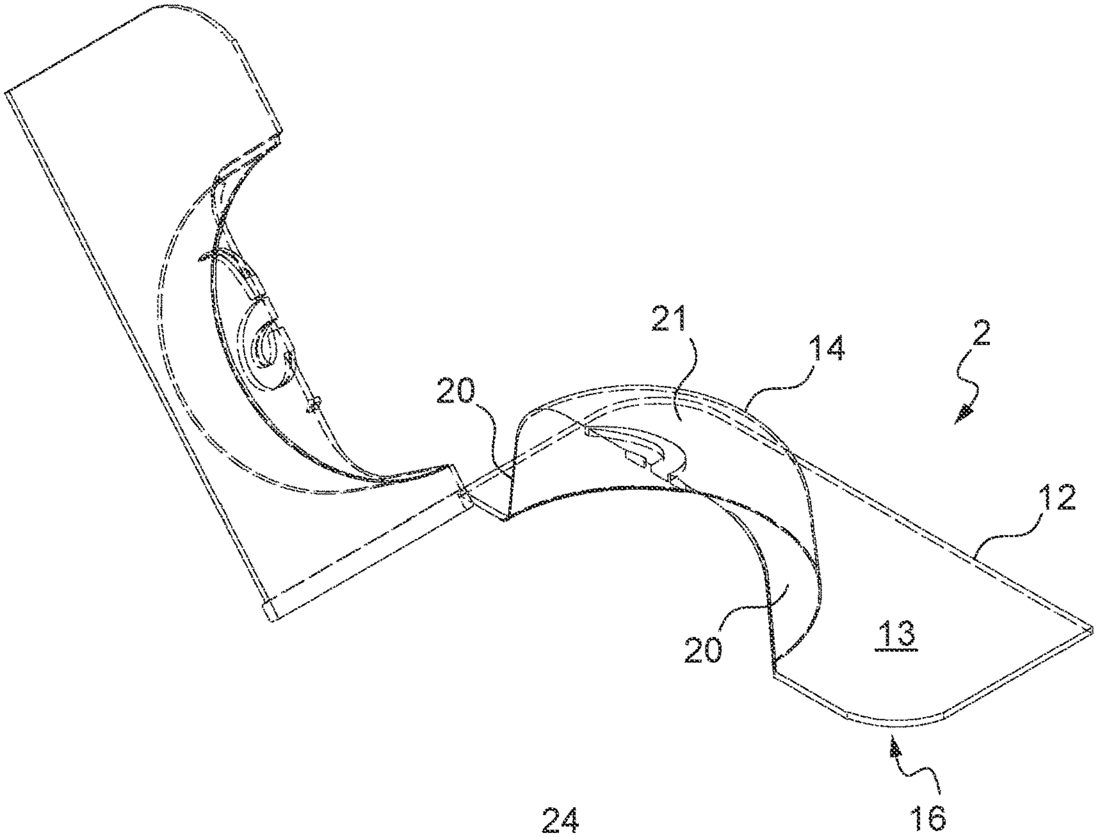

In FIG. 9, the blister unit 2 is pulled again so that all the cavity 14 is torn, thus forming an access to this latter.

Said otherwise, the bottom wall 21 of the cavity 14 is torn and the lateral wall 20 of the cavity 14 of the support shell 12 is also torn on a second side opposite to the first side.

The molded gum 5 is visible, and a portion of the cover film 16 which closes the cavity 14 remains under the gum 5.

Figure 10:
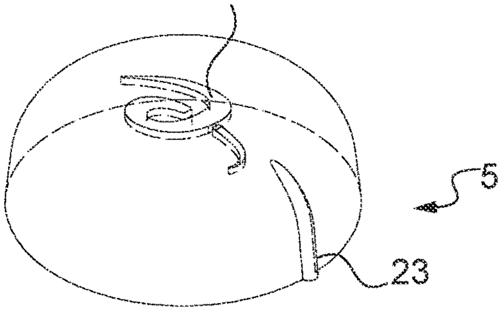

In FIG. 10, the blister unit 2 is fully torn and the molded gum 5 is extracted from the cavity 14.

The cover film 16 and the support shell 12 including the cavity 14 and the lateral and bottom walls 20 and 21 thereof are torn.

The molded gum 5 which is extracted has a complementary channel shape 23 which protrudes like a rib from a lateral side of the gum. This rib is formed thanks to the tearing channel 9 made on the cavity 14.

The molded gum 5 has also a complementary marking shape 24 which protrudes like a "e" from a top of the gum 5. This "e" is formed thanks to the marking member 22 made on the cavity 14.

The blister package for a pharmaceutical or food supplement product of the gum type as described above is particularly convenient not to damage the gum when the blister package is open and the gum extracted from the blister package.

In this blister package, the tearing notch is formed on both shell and cover film, so that both shell and cover film are torn when the blister package is the opening.

Furthermore, the tearing channel is formed on the shell and faces the tearing notch, so that the tear goes from the notch to the tearing channel very easily.

Besides, there is a synergistic effect between the tearing notch and the tearing channel formed on the shell and the gum molded in the shell, because the tearing channel drives the tear and allows to extract, by unsticking if any, the gum from the shell thanks to the complementary channel shape formed on this gum.

Thanks to the blister package, the gum is not damaged when the blister package is open and the gum extracted from the blister package.

Figure 11:
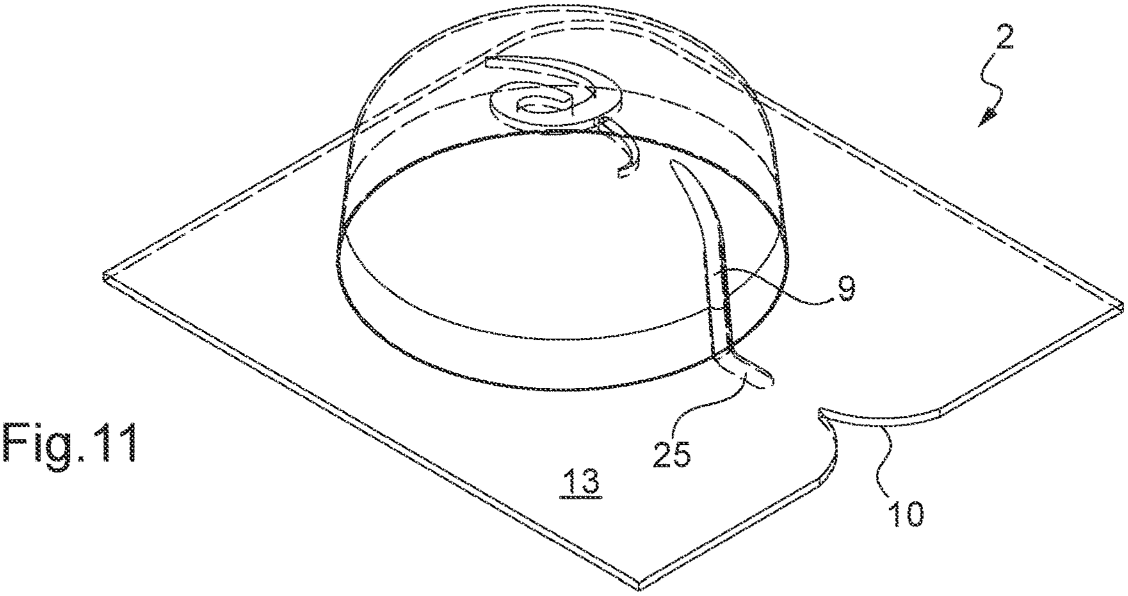
FIG. 11 shows a first variant of the blister unit illustrated in FIGS. 6 to 10.

FIG. 11 shows a first variant of the of the blister unit illustrated in FIGS. 6 to 10.

The blister unit 2 differs in that it comprises a pre-tearing channel 25 formed on the flat portion 13 and located between the tearing notch 10 and the tearing channel 9.

Said otherwise, the pre-tearing channel 25 meets and thus extends the tearing channel 9 towards the tearing notch 10, so that the latter is closer to a member which guides the tear.

Figure 12:
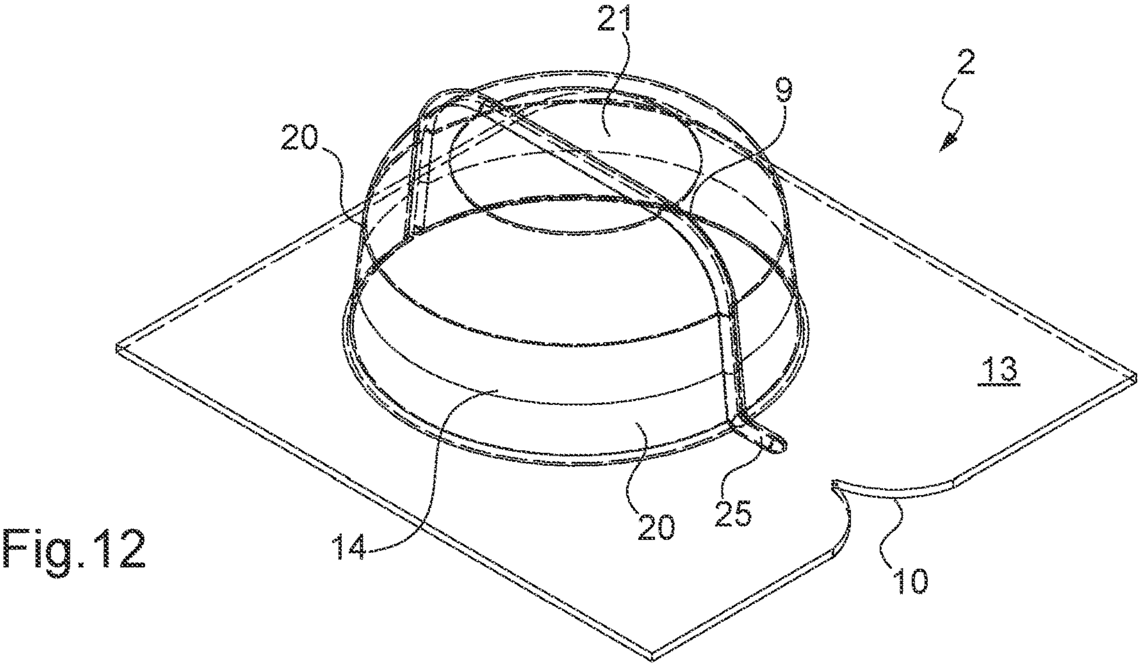
FIG. 12 illustrates a second variant of the blister unit.
Figure 13:
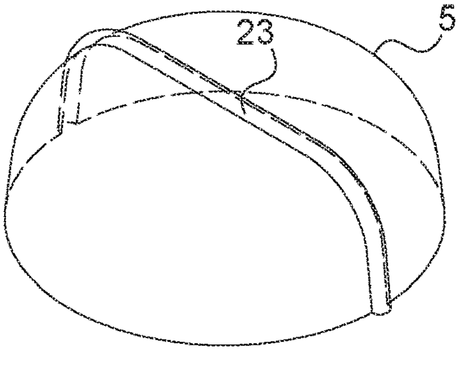
FIG. 13 shows the gum extracted from the blister unit illustrated in FIG. 12.

FIGS. 12 and 13 illustrate a second variant of the blister unit and the gum extracted therefrom.

The blister unit 2 differs in that it also comprises a pre-tearing channel 25 formed on the flat portion 13 and located between the tearing notch 10 and the tearing channel 9.

The blister unit 2 further differs in that the tearing channel 9 is elongated and extends from the first side of the lateral wall 20, along the bottom wall 21, to the second side of the lateral wall 20.

Furthermore, the cavity 14 is devoid of a marking member on the bottom wall 21.

The molded gum 5 thus differs in that she has a complementary channel shape 23 which protrudes like a rib and which extends from the lateral side of the gum, on a first side of the gum, along the top of the gum, and to the lateral side of the gum, on a second of the gum which is opposite to the first side. This elongated rib is formed thanks to the elongated tearing channel 9 made on the cavity 14.

The molded gum 5 is devoid of a complementary marking shape.

Figure 14:
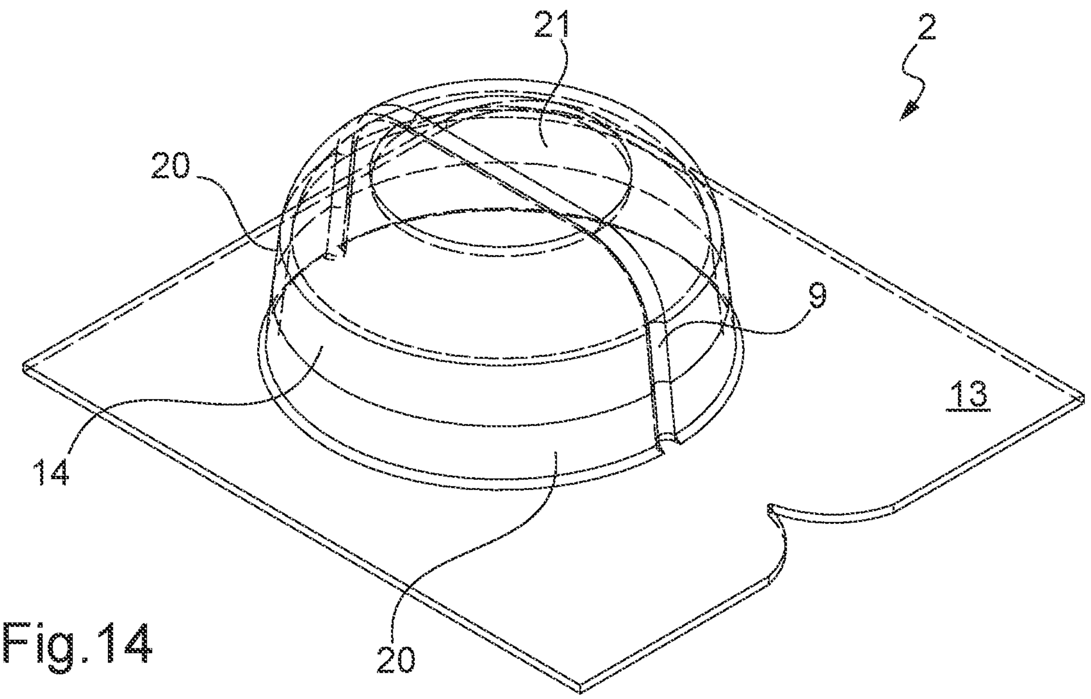
FIGS. 14 and 15 shows a blister unit and the gum extracted therefrom, according to a third variant.
Figure 15:
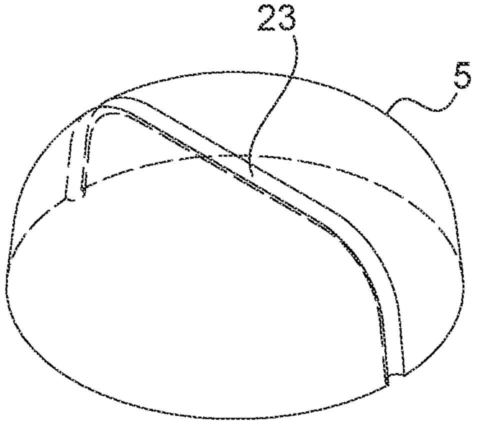

FIGS. 14 and 15 illustrate a third variant of the blister unit and the gum extracted therefrom.

The blister unit 2 differs in that the tearing channel 9 is elongated and extends from the first side of the lateral wall 20, along the bottom wall 21, to the second side of the lateral wall 20.

The blister unit 2 is devoid of a pre-tearing channel on the flat portion 13 and the cavity 14 is devoid of a marking member on the bottom wall 21.

Furthermore, the tearing channel 9 is formed negatively rather than positively on the cavity 14.

The molded gum 5 thus differs in that she has a complementary channel shape 23 which entails like a recess and which extends from the lateral side of the gum, on a first side of the gum, along the top of the gum, and to the lateral side of the gum, on a second of the gum which is opposite to the first side. This elongated recess is formed thanks to the elongated and negative tearing channel 9 made on the cavity 14.

The molded gum 5 is devoid of a complementary marking shape.

Figure 16:
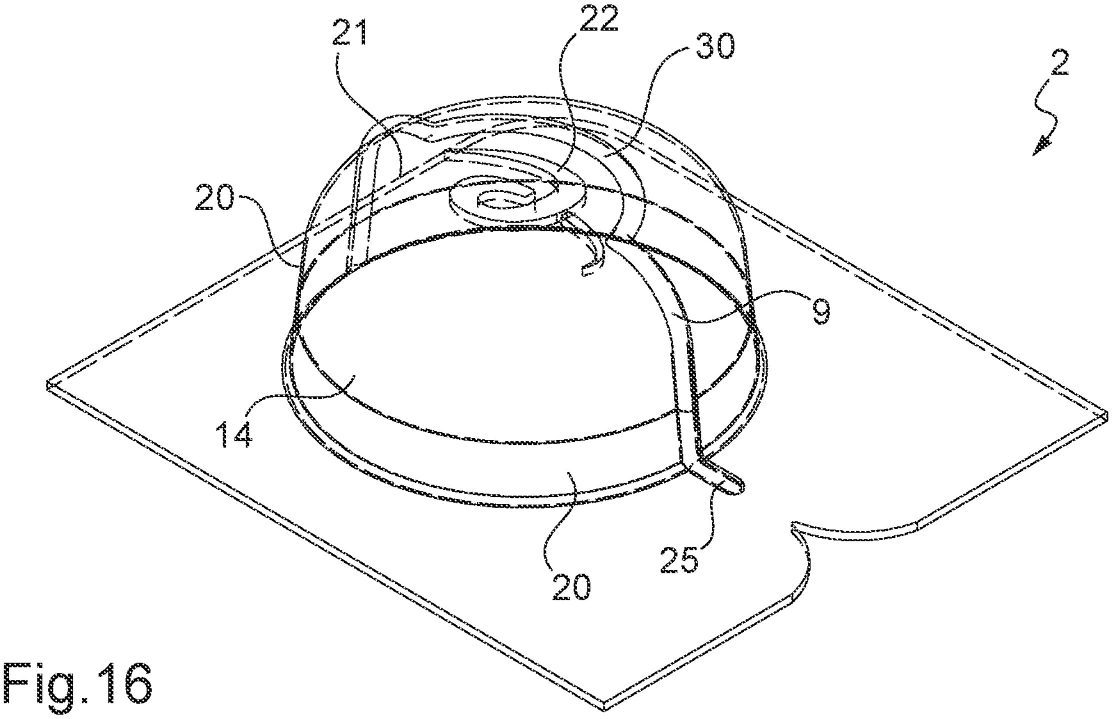
FIGS. 16 and 17 are similar view as FIGS. 14 and 15, according to a fourth variant.
Figure 17:
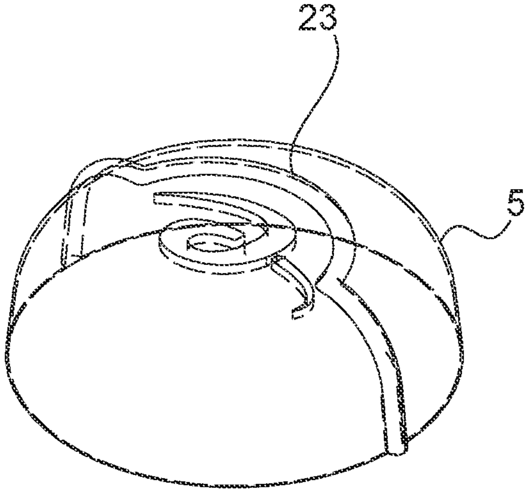

FIGS. 16 and 17 illustrate a fourth variant of the blister unit and the gum extracted therefrom.

The blister unit 2 differs in that it comprises a pre-tearing channel 25 formed on the flat portion 13 and located between the tearing notch 10 and the tearing channel 9.

The pre-tearing channel 25 meets the tearing channel 9.

The blister unit 2 further differs in that the tearing channel 9 is elongated and curved. In particular, he extends from the first side of the lateral wall 20 according to a straight line, along the bottom wall 21 according to a curved line 30, and to the second side of the lateral wall 20 according to a straight line.

Furthermore, the cavity 14 comprises the marking member 22 on the bottom wall 21.

The molded gum 5 thus differs in that she has a complementary channel shape 23 which protrudes like a rib and which extends from the lateral side of the gum, on a first side of the gum according to a straight line, along the top of the gum according to a curved line, and to the lateral side of the gum, on a second of the gum which is opposite to the first side, according to a straight line. This elongated rib is formed thanks to the elongated and curved tearing channel 9 made on the cavity 14.

The molded gum 5 further comprises the complementary marking shape 23.

As already explained and for the same reasons, the blister package for a pharmaceutical or food supplement product of the gum type as described above is particularly convenient not to damage the gum when the blister package is open and the gum extracted from the blister package.

Figure 18:
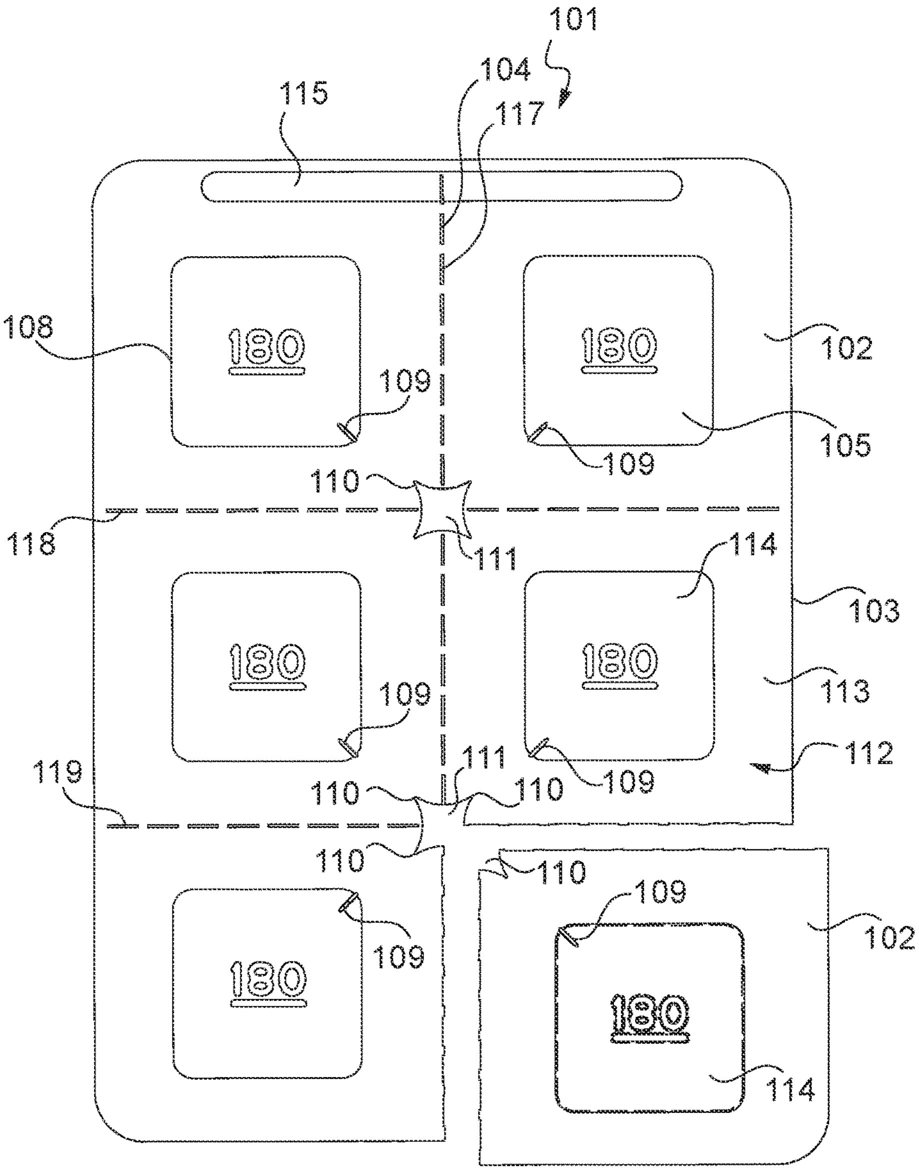
FIG. 18 is a similar view as FIG. 4, illustrating a blister package according to another embodiment, the blister package having a plurality of blister units, each of which comprising a pharmaceutical or food supplement product of the gum type and one of which being detached from the blister package.

FIG. 18 shows a blister package 101 according to another embodiment. The blister package 101 comprises a plurality of blister units 102 detachably from each other.

The blister package 101 here has six blister units 102 each comprising a pharmaceutical or food supplement product of the gum type 105.

In variant, the blister package may comprise more or less than six blister units.

The blister package 101 has a peripheral outline 103, which is here for instance of a substantially rectangular shape.

The blister package 101 has an internal edge 104 which is here for instance a straight line located in the middle of the blister package 101 and which divides the blister package 101 into two parts of three blister units 102.

The blister package 101 has also an upper surface 106 from which protrudes a plurality of housings 108, each of which containing a gum 105, and a lower surface (not represented) which is opposite to the upper surface 106.

The number of housings 108 is here equal to the number of blister units 102. In variant, a blister unit may comprise more than one gum and thus more than one housing.

The blister package 101 comprises a support shell 112 having a flat portion 113 and a plurality of cavities 114 formed on the flat portion 113. Each cavity 114 forms a housing 108 containing a gum 105.

Each gum 105 comprises at least one gelling agent, or gellant agent, and is molded into a respective cavity 114.

The blister package 101 further comprises a cover film 116 fixed on the flat portion 113 and closing all the cavities 114.

The support shell 112 is located on the upper surface 106 of the blister package 101, while the cover film is located on the lower surface of the blister package 101.

The blister package 101 may comprise a rib 115 formed in the support shell 112, on the upper surface 106 of the blister package 101.

The rib 115 here extends transversally and is located on two blister units 102.

The blister package 101 may also comprise pre-cut lines 117, 118 and 119, also called dotted lines, which are configured to facilitate detachment of each blister unit 102.

The pre-cut line 117 is here confused with the internal edge 104 and extends longitudinally, while the pre-cut lines 118 and 119 extend transversally and are configured to divide the blister package 101 into three parts, each including two blister units 102.

The blister package 101 comprises a plurality of recesses 111 located at the junction of both the internal edge 104 and pre-cut line 117 with respectively the pre-cut line 118 and the pre-cut line 119, each of these recesses 111 being formed by four tearing notches 110 facing to each other.

The blister package 101 here comprises two recesses 111 formed by a total of height tearing notches 110.

Each tearing notch 110 is formed both on the support shell 112 and on the cover film 116, so that each recess 111 emerges both on upper and lower surfaces 106 and 107 of the blister package 101.

Each tearing notch 110 is located at an angle of a respective blister unit 102 and is directed towards corners of a respective gum 105 and cavity 114.

The blister package 101 further comprises a plurality of tearing channel 109, each formed in a respective cavity 114 and facing a tearing notch.

As further explained below, each tearing channel 109 defines a complementary channel shape formed on the gum 105 molded in the respective cavity 114.

Each blister unit 102 is formed by a portion of the support shell 112, by a portion of the cover film 116, by a housing 108 and cavity 114 receiving a gum 105, by one or two tearing notches 110 and by a tearing channel 109.

Furthermore, each blister unit 102 is delimited by a portion of the pre-cut line 117 and by a portion of at least one of the pre-cut lines 118 and 119.

In FIG. 18, one of the blister units 102 is detached from the blister package 101.

The blister unit 102 has been detached thanks to the pre-cut line 117 and the pre-cut line 119.

The detachment of the blister unit 102 renders the tearing notch 110 free of access. In contrast, before detachment of the blister unit, the respective tearing notch is not free of access.

As explained above, the blister unit 102 which is detached is thus formed by a portion of the support shell 112, by a portion of the cover film 116, by a housing 108 protruding from the upper surface 106 and by a cavity 114 receiving the gum 105, by a tearing notch 110 and by a tearing channel 109.

Figure 19:
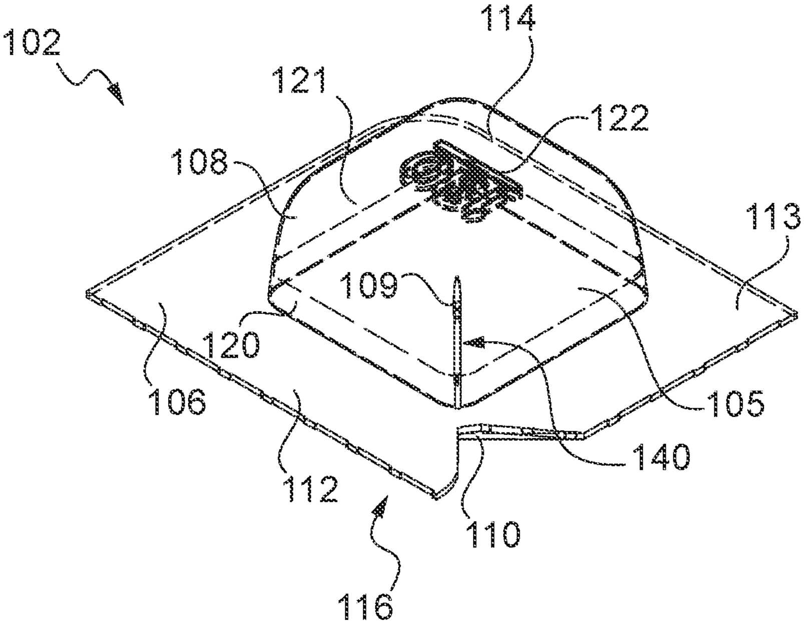
FIGS. 19 to 22 are similar views as FIGS. 7 to 10, illustrating different and successive steps for extracting the gum by tearing the blister unit shown on FIG. 18.

As shown on FIG. 19, the cavity 114 is defined by a lateral wall 120 extending from the flat portion 113 and by a bottom wall 121 linked to the lateral wall 120.

The cavity 114 has a generally square shape.

The lateral wall 120 is here parallelepipedic while the bottom wall 121 is flat.

The tearing channel 109 is here formed vertically on the lateral wall 120 and extends a little bit on the bottom wall 121.

The tearing channel 109 is here formed at the location of a corner portion 140 of the cavity 114

In particular, the tearing channel 109 extends from a junction between the lateral wall 120 and the flat portion 113, along the corner portion 140, to the bottom wall 121.

The tearing channel 109 extends along a straight line and continuously on the cavity 114.

The tearing channel 109 is here made positively on the cavity 114.

The tearing channel 109 and the tearing notch 110 are arranged so that they face one to each other.

The tearing notch 110 has a V-shape, a tip of the V being directed towards the tearing channel 109.

The tearing notch and the tearing channel are here remote to each other in order to keep a free space there between. Such a free space can be convenient for a user to grasp easily this part of the blister unit in order to tear it.

A marking member 122 is also formed on the cavity 114 and in particular in the bottom wall 121 thereof.

FIGS. 19 to 22 show different and successive steps for extracting the gum 105 by tearing the blister unit 102.

In FIG. 19, the blister unit 102 is pulled at the location of the tearing notch 110, in the angle, and in direction of the cavity 114 and in particular of the tearing channel 109.

Both flat portion 113 of support shell 112 and the cover film are torn.

Figure 20:
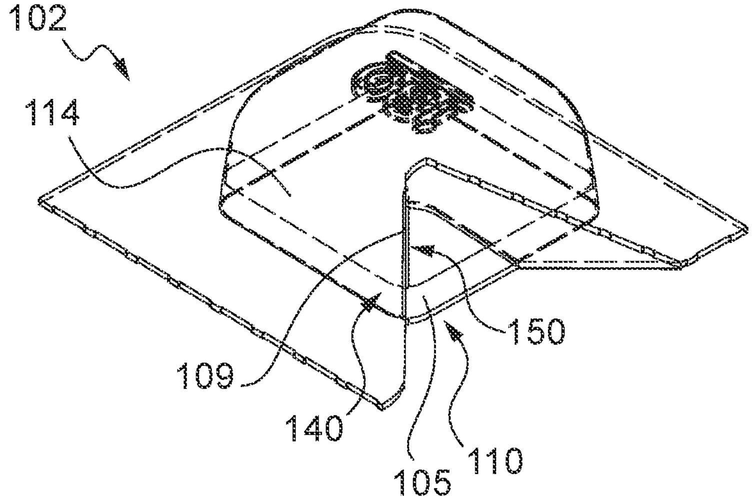

In FIG. 20, the blister unit 102 is pulled in the direction from the tearing notch 110 to the tearing channel 109.

The tearing channel 109 drives the tear along the corner portion 140 of the lateral wall 120 of the cavity 114 of the support shell 112, on the first side of the cavity 114.

Figure 21:
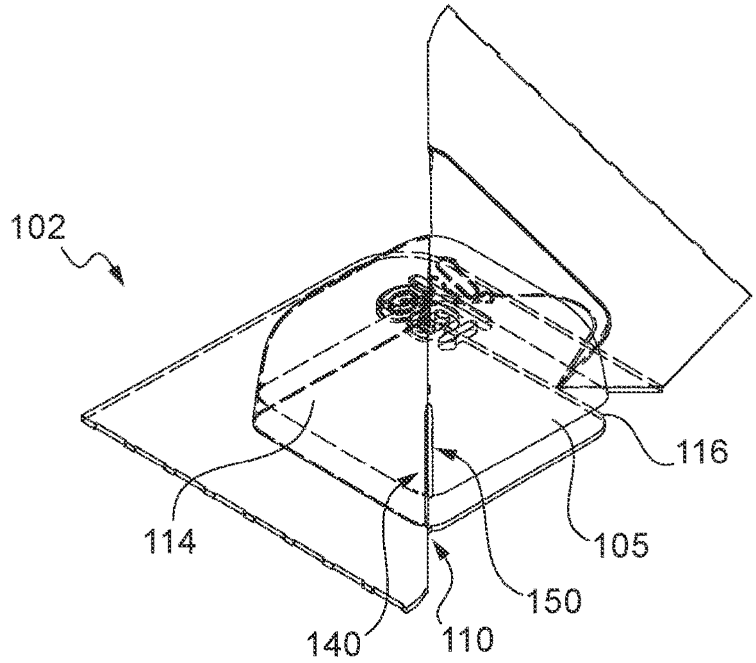

In FIG. 21, the blister unit 102 is pulled again so that all the cavity 114 is torn, thus forming an access to this latter.

Said otherwise, the bottom wall 121 of the cavity 114 is torn and the lateral wall 120 of the cavity 114 of the support shell 112 is also torn on a second side opposite to the first side.

The molded gum 105 is visible and a portion of the cover film which closes the cavity 114 can remain under the gum 105.

Figure 22:
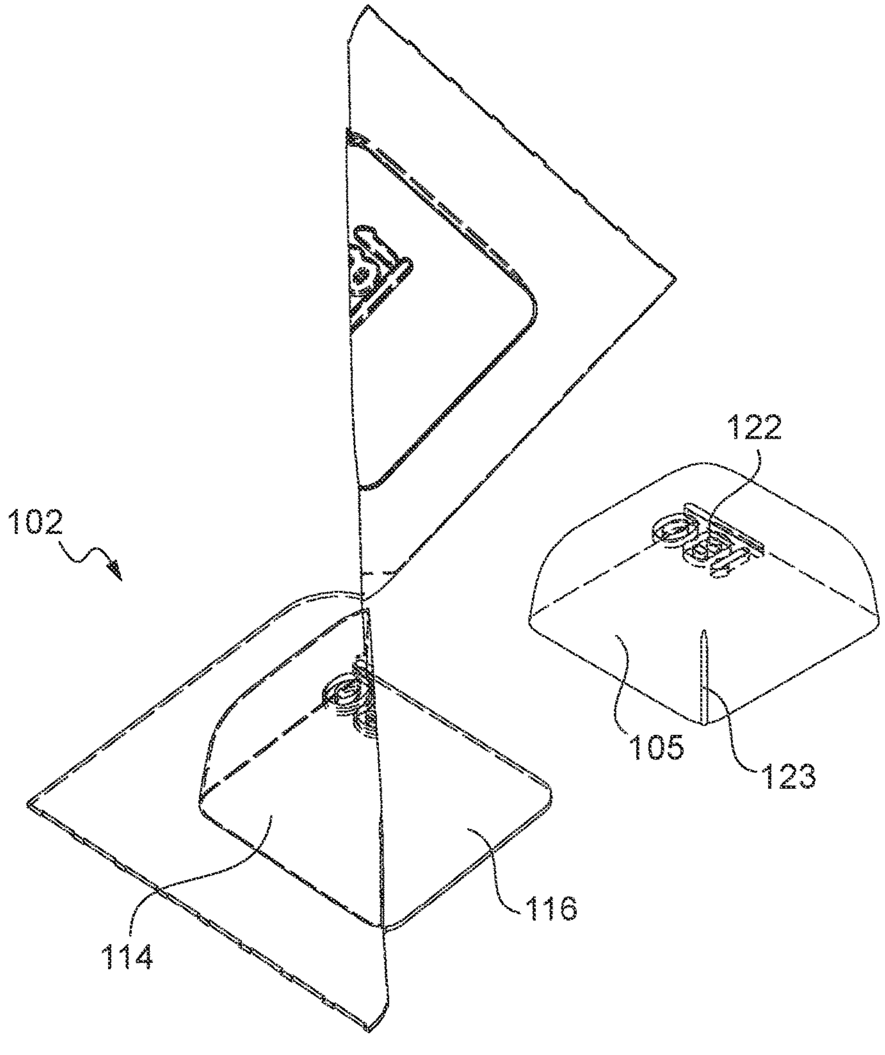

In FIG. 22, the blister unit 102 is fully torn and the molded gum 105 is extracted from the cavity 114.

The molded gum 105 which is extracted is here of a generally square shape and has a complementary channel shape 123 which is commonly made with a lateral corner 150 of the gum 105. This lateral corner is formed thanks to the tearing channel 109 made on the cavity 114.

The molded gum 105 has also a complementary marking shape 124 which protrudes like a "180" from a top of the gum 105. This "180" is formed thanks to the marking member 122 made on the cavity 114.

The blister package for a pharmaceutical or food supplement product of the gum type as described above is particularly convenient not to damage the gum when the blister package is open and the gum extracted from the blister package.

In this blister package, the tearing notch is formed on both shell and cover film, so that both shell and cover film are torn when the blister package is the opening.

Furthermore, the tearing channel is formed on the shell and faces the tearing notch, so that the tear goes from the notch to the tearing channel very easily.

Besides, there is a synergistic effect between the tearing notch and the tearing channel formed on the shell and the gum molded in the shell, because the tearing channel drives the tear and allows to extract, by unsticking if any, the gum from the shell thanks to the complementary channel shape formed on this gum.

The tearing channel is made commonly with the corner portion of the lateral wall and the complementary channel shape is thus made commonly on the gum with its lateral corner. Said otherwise, the shape of the gum and thus the shape of the cavity are used for at least partially masking respectively the complementary channel and the tearing channel.

Thanks to the blister package, the gum is not damaged when the blister package is open and the gum extracted from the blister package.

A method for manufacturing one of the blister package described above comprises the following steps:

- providing the support shell having the flat portion and cavities formed on the flat portion, the cavities being defined by the lateral wall extending from the flat portion and the bottom wall linked to the lateral wall, the support shell further having a tearing channel formed on the lateral wall of each cavity;
- molding the gums comprising at least one gelling agent into the cavities so that the molded gums have the complementary channel shapes formed by the respective tearing channels;
- fixing the cover film on the flat portion and closing the cavities;
- forming the tearing notches both on the support shell and cover film, so that each notch faces a respective tearing channel.

To be noted that the pharmaceutical product can be a chewable oral gum obtained from a formulation having or not at least one pharmaceutically active ingredient.

Such a chewable oral gum pharmaceutical formulation is intended to be chewed, or sucked and then ingested.

In particular, the product can be obtained from a chewable oral gum pharmaceutical formulation comprising water, sorbitol, gelatin and glycerol and at least one pharmaceutically active agent, and with respect to water: the ratio of gelatin is 0.20-0.80:1 by weight, the ratio of glycerol is 0.65-3.50:1 by weight, the ratio of sorbitol is 0.15-1.45:1 by weight.

For instance, the ratio of gelatin to water is 0.28-0.70:1 by weight, the ratio of glycerol to water is 0.70-3.00:1 by weight, the ratio of sorbitol to water is 0.20-1.40:1 by weight.

For instance, the amount of gelatin is 4-12% w/w, the amount of water is 15-30% w/w, the amount of sorbitol is 6-30% w/w, and the amount of glycerol is from 30 to 60% w/w.

The water activity of the formulation can be less than 0.75, preferably less than 0.70 and more preferably less than 0.61.

The at least one pharmaceutically active ingredient can be chosen from fexofenadine, the combination of magnesium hydroxide and aluminium hydroxide, the combination of magnesium hydroxide and aluminium hydroxide and simethicone, a combination of magnesium citrate and vitamin B6, thyme extract, *primula* extract or a combination of thyme extract and *primula* extract, Diphenhydramine, Chlorpheniramine, Loratidine, Cetirizine, Pseudoephedrine, Guaifenesin, Dextromethorphan, Naproxen, Aspirin, Acetaminophen, Ibuprofen, Fluriprofen, Ketoprofen, Drotaverine, Codeine, magnesium salts, for example, citrate, Silibinin, Ambroxol, Hyoscine Butyl Bromide, Bromhexine, Dextromethorphan, picosulphate, or pharmaceutically acceptable salts thereof, or one or more probiotic strains, vitamin A, K, D, E, C, B1, B2, B3, B5, B6, B7, B9, or B12, or multivitamin compositions, estrogen and estrogen derivatives, unsaturated fatty acids, including phospholipids, flavonoids, phytosterol, and combinations thereof.

The at least one pharmaceutically active ingredient can be chosen from fexofenadine, the combination of magnesium hydroxide and aluminium hydroxide, thyme extract, *primula* extract or a combination of thyme extract and *primula* extract and Acetaminophen, or pharmaceutically acceptable salts thereof.

The at least one pharmaceutically active ingredient can be chosen from Ambroxol, Bromhexine, the combination of magnesium hydroxide and aluminium hydroxide and simethicone, a combination of one or more magnesium salts and vitamin B6 or a pharmaceutically acceptable salt thereof, or soybean phospholipids, or extracts thereof.

The at least one pharmaceutically active ingredient can be fexofenadine, or pharmaceutically acceptable salts thereof, and with respect to water: the ratio of gelatin is 0.3-0.4:1 by weight, the ratio of glycerol is 0.7-1.3:1 by weight, the ratio of sorbitol is 0.4:1-1.4:1 by weight.

The at least one pharmaceutically active ingredient can be a combination of magnesium and aluminium hydroxides and with respect to water: the ratio of gelatin is 0.2-0.35:1 by weight, the ratio of glycerol is 1.2-1.5:1 by weight, the ratio of sorbitol is 0.2:1-0.4:1 by weight.

The at least one pharmaceutically active ingredient can be a combination of magnesium and aluminium hydroxides and simethicone and, typically with respect to water: the ratio of gelatin is 0.2-0.35:1 by weight, the ratio of glycerol is 1.2-1.5:1 by weight, the ratio of sorbitol is 0.2:1-0.4:1 by weight.

The at least one pharmaceutically active ingredient can be a combination of *primula* and thyme plant extracts and with respect to water: the ratio of gelatin is 0.4-0.7:1 by weight, the ratio of glycerol is 1.3-2.9:1 by weight, the ratio of sorbitol is 0.3-0.6:1 by weight.

The at least one pharmaceutically active ingredient can be Acetaminophen, or pharmaceutically acceptable salts thereof. In this case, typically, with respect to water: the ratio of gelatin is 0.2:1 to 0.4:1 by weight, the ratio of glycerol is from 1.2:1 to 1.6:1 by weight, the ratio of sorbitol is 0.15:1 to 0.3:1 by weight.

The at least one pharmaceutically active ingredient can be Bromhexine, or pharmaceutically acceptable salts thereof, and, typically, with respect to water: the ratio of gelatin is 0.2-0.6:1 by weight, the ratio of glycerol is 1.2-1.6:1 by weight, the ratio of sorbitol is 0.3-0.5:1 by weight.

The at least one pharmaceutically active ingredient can be a combination of a magnesium salt and vitamin B6 or pharmaceutically acceptable salts thereof, and typically, with respect to water: the ratio of gelatin is 0.2-0.6:1 by weight, the ratio of glycerol is 1.0-1.5:1 by weight, the ratio of sorbitol is 0.15-0.20:1 by weight.

The at least one pharmaceutically active ingredient can be soybean phospholipids, and typically, with respect to water: the ratio of gelatin is 0.4-0.7:1 by weight, the ratio of glycerol is 1.2-1.5:1 by weight, the ratio of sorbitol is 0.6-0.8:1 by weight.

The at least one pharmaceutically active ingredient can be Ambroxol or pharmaceutically acceptable salts thereof, and typically, with respect to water: the ratio of gelatin is 0.2-0.5:1 by weight, the ratio of glycerol is 1.3-1.6:1 by weight, the ratio of sorbitol is 0.2-0.6:1 by weight.

In an example, the oral gum comprises fexofenadine and has a unit weight of 180 mg. The formulation includes 26.42% wt per unit of Purified water, 0.78% wt per unit of NaOH, 0.29% wt per unit of NaH2PO4 H2O, 0.08% wt per unit of Na2HPO4 2H2O, 0.01% wt per unit of Red iron oxide, 8.51% wt per unit of Fexofenadine HCl, 70% 23.99% wt per unit of Sorbitol, 0.24% wt per unit of Sucralose, 95% 18.94% wt per unit of Glycerin, 6.98% wt per unit of Syloid (Silica), 9.00% wt per unit of Gelatin 160 LB8, and 5.00% wt per unit of PEG 4000.

In another example, the oral gum comprises fexofenadine and has a unit weight of 180 mg. The formulation includes 26.42% wt per unit of Purified water, 0.78% wt per unit of NaOH, 0.29% wt per unit of NaH2PO4 H2O, 0.08% wt per unit of Na2HPO4 2H2O, 0.01% wt per unit of Red iron oxide, 8.51% wt per unit of Fexofenadine HCl, 23.99% wt per unit of Sorbitol, 0.24% wt per unit of Sucralose, 95% 18.94% wt per unit of Glycerin, 6.98% wt per unit of Syloid, 5.00% wt per unit of Gelatin 160 LB8, 4.00% wt per unit of Gelatin 75 (pork), and 5.00% wt per unit of PEG 4000.

In variant, the product can be a chewable oral gum which comprise food supplements and which is devoid of a pharmaceutically active ingredient, in accordance to the definition of the food supplements given by the European Food Safety Authority (efsa). Such a food supplement product may also be called dietary product, and is also intended to be chewed, or sucked and then ingested.

Variants that are not illustrated are explained below.

The gelling agent is not gelatin but rather pectin or gellan gum.

The lateral wall of the cavity of the support shell may be cylindrical, tubular or conical and the bottom wall may be flat.

The tearing notch can be made on a peripheral outline of said blister package.

The tearing notch may have a shape different than a V-shape, for instance a W-shape, or a I-shape, or a Y-shape.

The tearing notch may be formed by a pre-cut or dotted straight line.

The pre-tearing channel can meet the tearing notch.

The pre-tearing channel can meet both the tearing notch and the tearing channel.

The tearing channel may extend vertically and then horizontally or circularly on the lateral wall of the cavity.

The tearing channel may extend discontinuously.

The tearing channel may be formed negatively on the cavity, so that the molded gum has a complementary channel shape which entails like a recess.

The gum may have different shapes, in addition to the generally rounded and generally square shapes illustrated in the drawings. For instance, the gum may have a generally parallelepiped shape, including rectangular, hexagon, octagon, diamond, etc. or a generally ovoid shape, including elliptical, oblong, etc. The cavity may have a corresponding shape to the gum.

The complementary marking shape on the molded gum has another shape than a “e” or “180”. Any letters or numbers or logos may be formed thanks to the marking member made on the cavity.

It should be noted more generally that the invention is not limited to the examples described and represented.

The invention claimed is:

1. A blister package for at least one pharmaceutical or food supplement product comprising:

a support shell having a flat portion and at least one cavity formed on said flat portion, said at least one cavity being defined by a lateral wall extending from said flat portion and a bottom wall linked to said lateral wall;

at least one pharmaceutical or food supplement product formulated for oral consumption comprising at least one gelling agent and molded into said at least one cavity;

a cover film fixed on said flat portion and closing said at least one cavity;

at least one tearing notch formed both on said support shell and cover film; and at least one tearing channel formed vertically on said lateral wall, extending only from a first side of said cavity on said lateral wall to a little bit on said bottom wall and facing said at least one tearing notch, said at least one tearing channel defining a complementary channel shape formed on said molded gum.

2. The blister package according to claim 1, wherein said at least one tearing notch is made on a peripheral outline of said blister package.

3. The blister package according to claim 1, wherein said at least one tearing notch is made on an internal edge of said blister package.

4. The blister package according to claim 1, wherein said at least one tearing notch has a V-shape, a tip of the V being directed towards said at least one tearing channel.

5. The blister package according to claim 1, comprising at least one pre-tearing channel formed on said flat portion and located between said at least one tearing notch and said at least one tearing channel.

6. The blister package according to claim 5, wherein said at least one pre-tearing channel meets said at least one tearing channel.

7. The blister package according to claim 1, wherein said at least one tearing channel extends only from a first side of said cavity on said lateral wall to said bottom wall.

8. The blister package according to claim 1, wherein said at least one tearing channel extends along a straight line on said cavity.

9. The blister package according to claim 1, wherein said at least one tearing channel extends along a straight line and next along a curved line on said cavity.

10. The blister package according to claim 1, wherein said at least one tearing channel extends continuously.

11. The blister package according to claim 1, wherein said at least one tearing channel is formed positively on said cavity, so that said gum has a complementary channel shape which protrudes like a rib.

12. The blister package according to claim 1, wherein said at least one tearing channel is formed negatively on said cavity, so that said gum has a complementary channel shape which entails like a recess.

13. The blister package according to claim 1, comprising a plurality of blister units detachably from each other, each blister unit comprising a gum molded into one said cavity and being configured to extract said gum by tearing said blister unit thanks to one said tearing notch and one said tearing channel.

14. A conditioning unit comprising one or a plurality of blister packages according to claim 1.

15. A method for manufacturing a blister package for at least one pharmaceutical or food supplement product of the gum type according to claim 1 comprising:

providing a support shell having a flat portion and at least one cavity formed on said flat portion, said at least one cavity being defined by a lateral wall extending from said flat portion and a bottom wall linked to said lateral wall, said support shell further having at least one tearing channel formed at least on said lateral wall;

molding at least one gum comprising at least one gelling agent into said at least one cavity so that said molded gum has a complementary channel shape formed by said at least one tearing channel;

fixing a cover film on said flat portion and closing said at least one cavity;

forming at least one tearing notch both on said support shell and cover film and facing said at least one tearing channel.

16. The blister package according to claim 1, wherein tearing channel does not extend to the second side of the lateral wall.

17. The blister package according to claim 1, wherein the tearing channel forms a rib shaped channel extending from the lateral wall to the bottom wall.

* * * * *